United States Patent [19]

Abolins et al.

[11] Patent Number: 4,894,402

[45] Date of Patent: Jan. 16, 1990

[54] POLYPHENYLENE COMPOSITIONS HAVING IMPROVED MELT BEHAVIOR AND IMPACT

[75] Inventors: Visvaldis Abolins, Delmar; Joseph C. Golba, Jr., Ballston Spa; Thomas A. Morelli, Delmar, all of N.Y.

[73] Assignee: General Electric Company, Selkirk, N.Y.

[21] Appl. No.: 44,868

[22] Filed: Apr. 30, 1987

Related U.S. Application Data

[63] Continuation of Ser. No. 810,465, Dec. 18, 1985, abandoned.

[51] Int. Cl.$^4$ .................... C08J 11/28; C08L 71/04
[52] U.S. Cl. .................... 524/157; 525/68; 525/905
[58] Field of Search .................... 524/157; 525/68, 905

[56] References Cited

U.S. PATENT DOCUMENTS

| | | | |
|---|---|---|---|
| 3,944,631 | 3/1976 | Yu et al. | 524/305 |
| 4,128,602 | 12/1978 | Katchman et al. | 524/132 |
| 4,360,618 | 11/1982 | Trementozzi | 524/68 |
| 4,529,761 | 7/1985 | Lohmeijer | 524/157 |
| 4,551,494 | 11/1985 | Lohmeijer . | |
| 4,681,906 | 7/1987 | Abolins et al. . | |

FOREIGN PATENT DOCUMENTS

8204761  5/1984  Netherlands .................... 524/157

*Primary Examiner*—Jacob Ziegler
*Attorney, Agent, or Firm*—Francis T. Coppa

[57] ABSTRACT

Impact-improved polyphenylene ether resin compositions which also exhibit improved melt behavior without degradation of other thermal properties are provided by combining a polyphenylene ether polymer, an alkyl or aralkyl sulfonate of an alkali metal, where the alkyl or aralkyl radical has 5 to 25 carbon atoms, and an acrylate-styrene-acrylonitrile terpolymer.

10 Claims, No Drawings

POLYPHENYLENE COMPOSITIONS HAVING IMPROVED MELT BEHAVIOR AND IMPACT

This is a continuation, division, of application Ser. No. 810,465 filed 12/18/85, now abandoned.

FIELD OF THE INVENTION

The melt behavior and impact strength of polyphenylene ether compositions can be improved or controlled without reducing the inherent thermal properties of such compositions. The improvement is achieved by a combination of polyphenylene ether resin, an alkyl or aralkyl sulfonate compound, and an acrylate-styrene-acrylonitrile interpolymer impact modifier.

BACKGROUND OF THE INVENTION

Polyphenylene ether resin compositions have long been utilized as thermoplastics because they exhibit a variety of beneficial physical and chemical properties which are useful in many applications. Excellent electrical properties, high DTUL as well as inherent flame retardance are three of the prime advantages of polyphenylene ether resins. Despite these advantages, polyphenylene ether resins are not necessarily suitable as molding compositions for many applications without further modification. One of the primary reasons for this is the relatively high melt viscosity of polyphenylene ether resins. A result of this property is relatively poor flow channel exhibited in a typical molding process. Poor flow results in difficulties in molding, losses in manufacturing efficiency as well as poor material performance. For example, in a typical molding process, polyphenylene ethers might have a flow channel of less than twelve inches even at very high temperatures. A glass transition temperature of 210° C. for polyphenylene ethers also indicates that these polymers have characteristically superior thermal properties which may require an element of control in order to provide certain useful products.

A very successful family of thermoplastic products are the modified-polyphenylene ether products wherein the polyphenylene ether base resin is modified or plasticized with another compound in order to provide useful plastic compositions. Typically, modified polyphenylene ethers are comprised of PPE and an alkenyl aromatic compound such as high impact polystyrene. These materials are alloyable in all proportions and provide a variety of products exhibiting advantages of both classes of compounds while minimizing the disadvantages of each. Other plasticization methods are also useful for polyphenylene ether compounds and many conventional plasticizers have been tried. One successful category of such plasticizers has been the triaryl phosphates which are low molecular weight materials which not only tend to plasticize the polyphenylene ethers but also impart an additional degree of flame retardance for these compounds.

Such plasticized modified-polyphenylene ether compositions have provided useful products which, however, do not necessarily exhibit the extraordinary thermal properties of unmodified polyphenylene ether. Additionally, some placticized modified-polyphenylene ether compositions tend to experience environmental stress cracking under certain conditions when exposed to stress cracking agents.

In U.S. Pat. No. 4,529,761, which issued July 16, 1985 and is hereby incorporated by reference, Lohmeijer described polyphenylene ether resin compositions which exhibited improved environmental stress crack resistance and which were comprised of polyphenylene ether resins or such resins modified with alkenyl aromatic resins and effective amounts an environmental stress crack resistance agent which was an alkyl or aralkyl sulfonate compound. Lohmeijer did not recognize, however, that such environmental stress crack resistance agents could be utilized in unmodified polyphenylene ether resin compositions (i.e. those which do not contain alkenyl aromatic compounds) and which would thereby provide extraordinarily beneficial thermal properties not otherwise available in modified-PPE systems.

Additionally, modified and unmodified polyphenylene ether compositions require further impact strength modification inorder to be useful for many thermoplastic applications. A variety of impact modification schemes for thermoplastics have been available in the art. Many of these, however, suffer due to a decrease in the inherent thermal properties of the basic plastic resin.

It has now been discovered that polyphenylene ether compositions can be improved with impact strength improving amounts of an ASA interpolymer modifier.

It has also been discovered that the melt behavior of such impact improved polyphenylene ether resin compositions can be controlled or improved without significantly reducing the inherent thermal properties of such materials and without having to incorporate conventional plasticizers in the compositions. Although conventional plasticizers can improve the melt behavior of polyphenylene ether resins as, for instance, by making them easier to flow in a molding process, they traditionally degrade the other thermal properties of the base resin due to their plasticizing effect. For example, when plasticizrs are added to polyphenylene ethers, the flow channel of the resin may increase but the heat distortion temperature of the plastic will generally decrease.

The present invention improves the melt behavior of the polyphenylene ether without conventional plasticizers, therefore, while the flow channel in a molding process will be improved, the heat distortion temperature and thermal stability will not be degraded. The polyphenylene ether resin compositions of tee present invention will thereby exhibit good low temperature and high temperature ductility, as well as excellent hydrolytic stability and the aforementioned excellent electrical properties.

It is therefore an object of the present invention to provide impact-improved polyphenylene ether resin compositions which exhibit improved or at least controlled melt characteristics while not generally degrading the inherent advantageous thermal properties of the base resin.

SUMMARY OF THE INVENTION

There is provided a thermoplastic resin composition exhibiting controlled melt behavior without degradation of the inherent thermal properties of the base resin, which comprises:
 (a) a polyphenylene ether resin or copolymers thereof, and which typically will be poly(2,6-dimethyl-1,4 phenylene ether);
 (b) a property improving amount of a compound of the formula $R-SO_3X$ wherein R represents and alkyl or aralkyl radical having 5 to 25 carbon atoms and X represents an alkali metal ion; and (c) an impact strength improving amount of an acrylate-styrene-acrylonitrile impact modifier.

Typically radical R will have approximately 12 to 20 carbon atoms and is preferably an alkyl radical, X is preferably a sodium ion. The polyphenylene ether base resin will generally have an intrinsic viscosity less than, approximately, 0.42 and preferably between 0.38 to 0.42 deciliters per gram as measured in chloroform at 25° C. Conventional polyphenylene ether resins have intrinsic typically in excess of 0.45 deciliters per gram and often in excess of 0.50 deciliters per gram and this is felt to substantially contribute to the poor melt behavior of such conventional, unmodified polyphenylene ether resins. On the other hand, there is a practical limit as to how low the intrinsic viscosity of such polyphenylene ether resins can be and those acquainted with polymer physics will recognize that intrinsic viscosities for PPE much lower than the 0.38 deciliters per gram required by compositions of the present invention will yield polymer products having poor physical properties. When the intrinsic viscosity of the PPE utilized in compositions of the present invention rises much above the 0.42 deciliters per gram mentioned above, the compositions begin to behave more like relatively unprocessable conventional polyphenylene ether resin despite the addition of the melt behavior improving agents utilized by the present invention.

DESCRIPTION OF THE INVENTION

Polyphenylene ethers are a well known class of compounds sometimes referred to as polyphenylene oxides. Examples of suitable polyphenylene ethers and processes for there preparation can be found in U.S. Pat. Nos. 3,306,874; 3,306,875; 3,257,357; and 3,257,358. Compositions of the present invention will encompass homopolymers, copolymers and graft copolymers obtained by the oxidative coupling of phenolic compounds. The preferred polyphenylene ethers used as base resins in compositions of the present invention will be comprised of units derived from 2,6-dimethyl phenol. Also contemplated are PPE copolymers comprised of units derived from 2,6-dimethyl phenol and 2,3,6-trimethyl phenol.

The polyphenylene ether resin compositions of the present invention are improved by the addition of ASA interpolymer modifier, in accordance with the description below.

An ASA interpolymer modifier is a terpolymer comprised of acrylate-styrene-acrylonitrile and is commercially available from a variety of sources. The preferable ASA interpolymer modifiers are those having a crosslinked acrylate rubber core such as butyl acrylate. Surrounding this crosslinked core is a shell-like structure of crosslinked styrene-acrylonitrile which surrounds and interpenetrates the crosslinked core. The integrity of such preferable core-shell structures is maintained by the interpenetrating network of the several crosslinked moieties rather than by grafting the structures together. Some manufacturers, however, provide grafted structures which may provide suitable properties in certain applications.

An additional component of the ASA interpolymer modifiers is a continuous phase of linear styrene-acrylonitrile (i.e., non-crosslinked SAN) throughout which the crosslinked core-shell structure is uniformly dispersed. Among the particularly preferred ASA interpolymer modifiers are those produced in accordance with the teachings of Yu and Gallagher in U.S. Pat. No. 3,944,631 (which is hereby incorporated by reference). These interpolymer compositions are formed by the following type of three-step, sequential polymerization process:

1. emulsion polymerizing a monomer charge (herein designated "(meth)acrylate", for purposes of the present invention), of at least one $C_2$–$C_{10}$ alkyl acrylate, $C_8$–$C_{22}$ alkyl methacrylate, or compatible mixtures thereof, in an aqueous polymerization medium in the presence of an effective amount of a suitable di- or polyethyleneically unsaturated crosslinking agent for such type of monomer, with the $C_4$–$C_8$ alkyl acrylates being the preferred (meth)acrylate monomers for use in this step;
2. emulsion polymerizing a monomer charge of styrene and acrylonitrile in an aqueous polymerization medium, also in the presence of an effective amount of a suitable di- or polyethyleneically unsaturated crosslinking agent for such monomers, said polymerization being carried out in the presence of the product from Step 1 so that the crosslinked (meth)acrylate and crosslinked styrene-acrylonitrile components form an interpolymer wherein the respective phases surround and penetrate one another, and
3. either emulsion or suspension polymerizing a monomer charge of styrene and acrylonitrile, in the absence of a crosslinking agent, in the presence of the product resulting from Step 2.

This ASA product, which may be used as the interpolymer impact modifier in the PPE blends of the present invention is generally comprised of about 5% to about 50%, by weight, of at least one of the above-identified crosslinked(meth)acrylates, from about 5% to about 35%, by weight, of the crosslinked styrene-acrylonitrile component and from 15% to about 90%, by weight, of the uncrosslinked styrene-acrylonitrile component. It contains little graft polymerization between the styrene-acrylonitrile copolymer components and the crosslinked (meth)acrylate polymeric component. Further details regarding this type of polymer composition can be found in the aforementioned U.S. Pat. No. 3,044,731 to A. J. Yu et al. The ASA interpolymer provided by the foregoing process can be isolated and dried by conventional means and can be provded in powder or pellet form.

The preferred PPE polymer compositions of the present invention will be comprised of approximately 0.5 to 10 parts by weight of the melt behavior improving compound of the formula R-SO$_3$X and approximately 1 to 20 parts by weight of the ASA interpolymer modifier based upon 100 parts of the polyphenylene ether base resin.

It is particularly preferred that about 1 to 5 parts by weight of the melt behavior additive will be used per 100 parts of the PPE base resin. When less than about 0.5 part additive is utilized, insufficient beneficial effect will be achieved for typical applications. When large amounts of the additive is utilized, little additional benefit is achieved while other advantageous properties of PPE may be diminished. The melt behavior improving additive compound is an alkyl or aralkyl sulfonate having a formula R-SO$_3$X in which R represents an alkyl or aralkyl radical with 5-25 carbon atoms and preferably and 12 to 20 carbon atoms and X represents an alkali metal ion which is preferably a sodium ion. It is also possible to utilize a mixture of such sulfonates.

Suitable sulfonates include the following products which may be obtained commercially. $C_{12-20}H_{25-40}SO_3Na$ are compounds sold under the tradename HOSTASTAT. Compounds sold under the tradename ATMER 190 have the general formula $C_xH_{2x+1}SO_3Na$. Others are sold under the tradename MARANIL A and have the general formula $C_{12}H_{25}$-$C_6H_4$-$SO_3Na$. It will be recognized by those skilled in the art that these formulas represent sulfonate salts of hydrocarbon compounds having varying chain lengths.

A property improving amount of the ASA interpolymer modifier is required. Less than a single part per 100 parts PPE will exhibit little useful effect. Large amounts of the modifier could be utilized but the inherent advantageous properties of the PPE resin are substantially diminished when more than approximately 20 parts by weight ASA interpolymer are utilized. Suitable ASA interpolymer modifiers are available under the tradename GELOY, from General Electric Company.

The improved compositions of the present invention are provided by combining the polyphenylene ether based resin and the property improving melt behavior additive by conventional means as will be demonstrated in the examples below. Blended or extruded compositions may be molded and tested by conventional means.

The following examples illustrate the invention without limitation. All of the foregoing U.S. Patents are hereby incorporated by reference.

EXAMPLE 1

A composition of the present invention exhibiting improved melt behavior and impact strength was provided in the following manner and compared to several conventionally modified systems. The four blends described in Table 1 were compounded using a 28 mm Werner & Pfleiderer twin screw extruder having this temperature profile through several stages (set temperatures): 500° F. (Feed Section), 550° F., 590° F., 590° F., 590° F., 600° F. (Die Temperature). During compounding, a vacuum of 5 inches was maintained for all four samples, while the screw RPM's were a constant 270. The extrusion conditions (such as screw torque, measured in amperes) were observed to change among the materials due to the presence of the sodium salt additive. The polyphenylene ether resin, having the intrinsic viscosity indicated in Table 1, was the oxidative coupling product of 2,6-dimethyl phenol.

TABLE 1

| Composition (parts by weight) | A* | B* | C* | D* | 1 |
|---|---|---|---|---|---|
| poly(2,6-dimethyl-1,4-phenylene ether)[a] | 100 | 100 | 100 | 100 | 100 |
| $C_{12-20}H_{25-41}SO_3Na$[b] | 3 | 2 | 2 | 2 | 2 |
| Comparative impact modifiers | — | 5[c] | 5[d] | 5[e] | — |
| ASA Impact modifiers | — | — | — | — | 5[f] |

*Comparative Examples
[a] polyphenylene ether having as intrinic viscosity of 0.40 dl/g as measured in chloroform at 25°C.
[b] HOSTASTAT HS-1 sodium salt of lauryl sulfonate (A.G. Hoechst Co.)
[c] KRATON G 1651, Shell Chemical Co., SEBS rubber, hydrogenated styrene-ethylene butylene-styrene copolymer
[d] KRATON KGX 1701, Shell Chemical Co., polystyrene-poly(ethylene-propylene) diblock copolymer
[e] KRATON D 1101, Shell Chemical Co., unsaturated styrene-butadiene block copolymer
[f] GELOY acrylate-styrene-acrylonitrile terpolymer, General Electric Company Pellets of each of the aforementioned compositions were molded into ASTM test specimens using a 4 ounce Newbury injection molding machine. Prior to molding the pellets were dried for four hours at 115° C. The following molding conditions were present and remained constant during the molding process of all four samples:

| | |
|---|---|
| Barrel Temperature (°F.) | 630° |
| Mold Temperature (°F.) | 220° |
| Cycle Time, Total (Sec) | 40 |
| Back Pressure (Psi) | 50 |
| Injection Speed | Slow |

Certain conditions were observed to change during molding process for each of the four sample materials. Table 2 describes these changes in molding conditions which are attributable to the inherent advantages of the present invention.

TABLE 2

| | Composition | | | | |
|---|---|---|---|---|---|
| Molding Conditions | A* | B* | C* | D* | 1 |
| Melt Temperature °F. | 630 | 631 | 629 | 628 | 629 |
| Pressure Required to Fill Mold Cavities (PSI) | 925 | 1100 | 1000 | 1200 | 850 |
| Channel Flow @ 10,000 psi (in) | 13 | 11 | 12 | 10 | 19.5 |

*Comparative Examples

It is apparent that the sulfonate salt additive lowers the required melt temperature of the impact-improved polyphenylene ether. Furthermore there is a concurrent lowering of the pressure required to fill the cavities of the ASTM test specimen mold. The channel flow was markedly improved.

The sulfonate salt additive for impact-improved polyphenylene ether improves not only the extrusion and compounding process for such materials but also is beneficial for the polyphenylene ether molding process.

The foregoing experimental materials were tested to compare important physical properties of the resultant thermoplastic products. The melt viscosities of the materials were tested using an Instron melt rheometer at 600° F. and 1500 sec$^{-1}$ shear rate. Table 3 describes the other physical properties which were tested by ASTM test methods and other accepted test practices.

TABLE 3

| COMPOSITION NO. | | A* | B* | C* | D* | 1 |
|---|---|---|---|---|---|---|
| Tensile Str. | (psi) | 10,500 | 9,700 | 10,200 | 10,400 | 8,500 |
| Elongation | (percent) | 30 | 15 | 25 | 29 | 9 |
| Flexural Str. | (psi) | 15,200 | 13,700 | 14,100 | 14,500 | 12,600 |
| Flexural Mod. | (psi) | 349,000 | 323,000 | 338,000 | 335,000 | 315,000 |
| Impact Resistance | | | | | | |
| Notch. Izod @ 73° F. | (ft-lb/in.n) | 1.9 | 4.3 | 2.5 | 2.3 | 3.3 |
| Notch. Izod @ −40° F. | (ft-lb/in.n) | 1.9 | 2.2 | 2.2 | 1.9 | 1.9 |
| Dynatup Imp. Str. @ 73° F. | (in-lbs) | 205 | 345 | 399 | 451 | 90 |

TABLE 3-continued

| COMPOSITION NO. | | A* | B* | C* | D* | 1 |
|---|---|---|---|---|---|---|
| Dynatup Imp. Str. ° −40° F. | (in-lbs) | 64 | 155 | 193 | 127 | 59 |
| Melt Viscosity @ 600° F. and 1500 sec$^{-1}$ | (poise) | 2440 | 3040 | 2690 | 3340 | 1460 |
| DTUL @ 264 psi | (°F.) | 367° F. | 359° F. | 356° F. | 257 | 360 |

*Comparative Example

The most beneficial increases are those of impact resistance and melt flow. The latter benefit is achieved with a very slight sacrifices in deflection temperature under load. Tensile properties were generally lower.

EXAMPLES 2-5

The formulations indicated in Table 4 were dry blended on a 28 mm Werner and Pfleiderer extruder having a straight profile set temperature of 530° F., a screw speed of 300 rpm and a feed rate of, approximately, 10.5 lbs/hr. Test samples were molded on a 28 ton Engel injection molding machine having barrel set temperatures of 625-630° F. Molded parts were aged overnight at 70° F. and 50% relative humidity prior to testing.

The formulations containing lower levels of sodium salt (e.g. 1-2 parts HS-1) processed well and no abnormal die swell was noted. At 3-4 parts sodium salt, die swell started to become significant and interfered with stranding and sample collection. Melt temperature at the die decreased as the amount of sodium salt additive was increased. In this series of blends the drive torque was maintained relatively constant. All blends were translucent, indicating a two phase morphology. Delamination was noted at higher levels of sodium salt additive. Impact strength tends to increase with the sodium salt additive level, however, tensile properties tend to decrease. The blends containing the ASA impact modifier also processed well, however, some delamination in the gate regions of the test specimens was noted for blends having high rubber concentrations. While impact strength improved with the addition of rubber there was virtually no evidence of stress whitening in the failure zone. Therefore there was little indication of the massive crazing mechanism typically observed for modified-PPE systems possessing good impact strenghts. Yield stress decreases with rubber loading. As with many impact modified polymers, yield stress typically decreases as notched Izod increases. Finally, while elongations are quite low valued, it appears that the addition of HS-1 is largely responsible for this and that tensile elongation is not primarily dependent on ASA impact modifier addition.

We claim:

1. A thermoplastic composition having improved impact strength and melt behavior consisting essentially of:
   (a) a polyphenylene ether resin having an intrinsic viscosity less than approximately, 0.42 dl/g as measured in chloroform at 25° C.;
   (b) a compound of the formula R-SO$_3$X wherein R represents an alkyl or aralkyl radical having 5 to 25 carbon atoms and X represents an alkali metal ion, in an amount effective for improving the melt behavior of said polyphenylene ether resin; and
   (c) an impact strength improving amount of an acrylate-styrene-acrylonitrile terpolymer.

2. A composition as in claim 1 wherein the compound of formula R-SO$_3$X is present in an amount of, approximately, 0.5 to 5.0 parts by weight per 100 parts of the polyphenylene ether resin.

3. A composition as in claim 1 wherein the acrylate-styrene-acrylonitrile terpolymer is present in an amount of, approximately, 1 to 20 parts of the polyphenylene ether resin.

4. A composition as in claim 1 wherein the acrylate-styrene-acrylonitrile terpolymer is comprised of, approximately, 5 to 50 weight percent of at least one crosslinked acrylate, 5 to 35 weight percent crosslinked styrene-acrylonitrile, and 15 to 90 weight percent uncrosslinked styrene-acrylonitrile.

5. A composition as in claim 1 wherein the compound of formula R—SO$_3$X is a mixture of compounds having said formula and R represents alkyl radicals independently having 12 to 20 carbon atoms.

6. A composition as in claim 1 wherein in the formula R—SO$_3$X, X represents a sodium ion.

7. A composition as in claim 1 wherein the polyphenylene ether is a homopolymer or a copolymer.

8. A composition as in claim 7 wherein the polyphenylene ether is poly(2,6-dimethyl-1,4-phenylene)ether.

9. A composition as in claim 1 wherein the polyphenylene ether has an intrinsic viscosity of approximately, 0.38 to 0.42 dl/g.

10. A molded article comprised of the thermoplastic composition of claim 1.

* * * * *

TABLE 4

| Compositions (parts by weight) | E* | F* | G* | 2 | 3 | 4 | 5 |
|---|---|---|---|---|---|---|---|
| polyphenylene ether$^{(a)}$ | 99 | 98 | 97 | 94 | 94 | 94 | 94 |
| C$_{12-30}$H$_{25-41}$SO$_3$Na$^{(b)}$ | 1 | 2 | 3 | 2 | 2 | 2 | 2 |
| ASA impact modifier$^{(c)}$ | — | — | — | 4 | 6 | 8 | 10 |
| Properties | | | | | | | |
| Tensile Yield (psi) | 10,600 | 10,200 | 9,100 | 8,400 | 8,100 | 7,600 | 7,500 |
| Tensile Strength Breaks (psi) | 10,800 | 7,300 | 5,900 | 3,300 | 3,500 | 2,900 | 2,500 |
| Elongation (%) | 149 | 31 | 39 | 35 | 27 | 26 | 27 |
| Izod Rm. Temp (ft.lbs./in) | .82 | 1.04 | 1.5 | 2.7 | 3.2 | 3.1 | 3.9 |

*Comparative Examples
$^{(a)}$Same as Example 1
$^{(b)}$Same as Example 1
$^{(c)}$Same as Example 1